(12) United States Patent
Raveendran et al.

(10) Patent No.: US 7,412,100 B2
(45) Date of Patent: Aug. 12, 2008

(54) APPARATUS AND METHOD FOR SUB-SAMPLING IMAGES IN A TRANSFORM DOMAIN

(75) Inventors: Vijayalakshmi R. Raveendran, San Diego, CA (US); Ann Chris Irvine, Bonsall, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/933,618

(22) Filed: Sep. 2, 2004

(65) Prior Publication Data

US 2005/0053152 A1   Mar. 10, 2005

Related U.S. Application Data

(60) Provisional application No. 60/500,770, filed on Sep. 4, 2003.

(51) Int. Cl.
   G06K 9/36   (2006.01)
   G06K 9/46   (2006.01)

(52) U.S. Cl. ............ 382/233; 382/240; 382/250; 382/251; 382/299; 382/305; 375/240.21; 375/240.18

(58) Field of Classification Search ............... 382/232, 382/233, 236, 239, 240, 244, 245, 246, 248, 382/250–254, 260, 274, 299, 300, 302, 305; 341/79; 375/204.21, 240.11, 240.18, 240.19, 375/240.2
See application file for complete search history.

(56) References Cited

U.S. PATENT DOCUMENTS

| | | | |
|---|---|---|---|
| 5,021,891 A | 6/1991 | Lee | |
| 5,107,345 A | 4/1992 | Lee | |
| 5,452,104 A | 9/1995 | Lee | |
| 6,266,817 B1 * | 7/2001 | Chaddha | 725/146 |
| 6,393,060 B1 * | 5/2002 | Jeong | 375/240.19 |
| 6,549,577 B2 | 4/2003 | Florencio et al. | 375/240.21 |
| 2002/0057850 A1 * | 5/2002 | Sirohey et al. | 382/299 |
| 2002/0145610 A1 * | 10/2002 | Barilovits et al. | 345/538 |
| 2002/0150159 A1 * | 10/2002 | Zhong | 375/240.16 |
| 2003/0021485 A1 | 1/2003 | Raveendran et al. | 382/244 |
| 2004/0008790 A1 * | 1/2004 | Rodriguez | 375/240.26 |
| 2004/0013195 A1 * | 1/2004 | Panusopone et al. | 375/240.2 |
| 2004/0045038 A1 * | 3/2004 | Duff et al. | 725/133 |

FOREIGN PATENT DOCUMENTS

WO   98/41929   9/1998

OTHER PUBLICATIONS

Dipan Mehta, "A Primer To Video Transcoding: Image Transcoding", Jan. 26, 2002, pp. 1-5.

(Continued)

Primary Examiner—Matthew C. Bella
Assistant Examiner—Ali Bayat
(74) Attorney, Agent, or Firm—Milan Patel; Timothy Buckley; Thomas R. Rouse

(57) ABSTRACT

A method of receiving a bit-stream and extracting data from the bit-stream based on one or more criteria and sub-sampling (for example, filtering and decimating) the extracted data in the transform domain. The method either stores the data for future transmission or transmits the data to one or more connected devices, such as a mobile terminal or a fixed terminal.

84 Claims, 5 Drawing Sheets

OTHER PUBLICATIONS

Andreas Kassler, "Classification and evaluation of filters for wavelet coded videostreams", May 8, 2001, pp. 13.

International Search Report PCT/US2004/028763, International Search Authority-European Patent Office, Dec. 30, 2004.

* cited by examiner

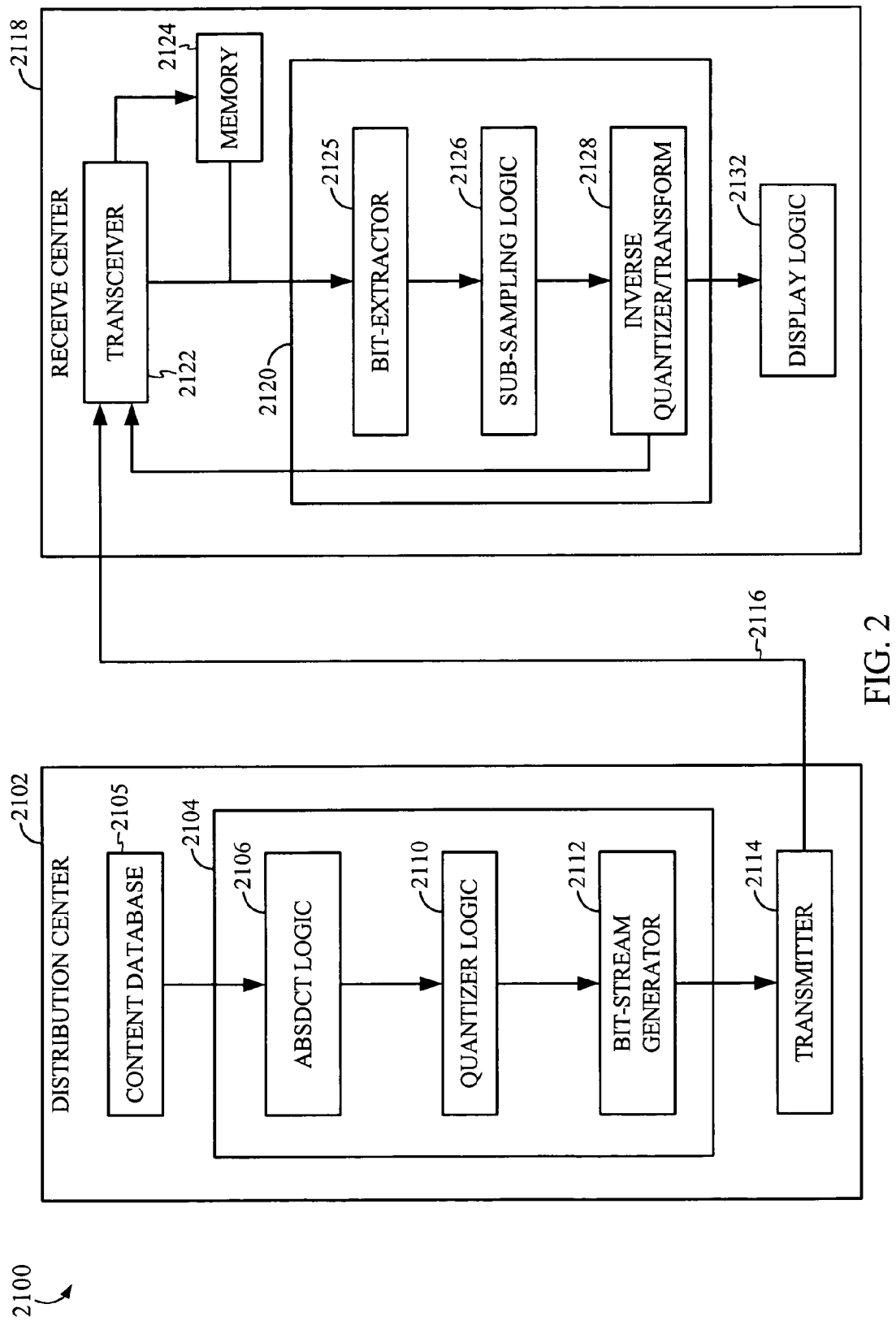

APPARATUS AND METHOD FOR SUB-SAMPLING IMAGES IN A TRANSFORM DOMAIN

CROSS-REFERENCE TO RELATED APPLICATIONS

This application claims the benefit of U.S. Provisional Patent Application Ser. No. 60/500,770, filed Sep. 4, 2003, and assigned to the assignee hereof and hereby expressly incorporated by reference herein.

FIELD OF INVENTION

The present invention relates to processing image data, more specifically a method of processing image data in the transform domain after extracting data based on desired level resolution and desired level of quality.

BACKGROUND

Typically, digital information is compressed using a preselected format or a process by an encoder. However, conventional digital consumer formats such as High Definition Television (HDTV), Digital Versatile Disc or Video Disc (DVD), Advanced Television Systems Committee (ATSC), Digital Video Broadcast (DVB), Digital Satellite System (DSS) operate at various desired levels of resolution, frame rates and/or bit rates and desired levels of quality. Also, non-standard resolutions may be used by mobile devices wherein the resolution based on screen size of user defined resolutions. Accordingly, in order to cater to multiple desired levels of resolution and desired levels of quality on image, various techniques must be developed.

Therefore there is a need for a more versatile, simple and/or efficient system that can generate multiple descriptions of video without loosing quality.

SUMMARY

Accordingly, disclosed embodiments herein address the above stated needs by providing a method for an electronic device that extracts encoded data based on desired level of resolution and desired level of quality, and sub-samples the extracted data in the transformed domain, thereby allowing greater flexibility without loosing quality.

In an embodiment, an apparatus, such as a server or a base transmitter operable in wireless or wired communication system, encompasses a method of receiving a bit-stream, extracting data from the bit-stream based on one or more criteria and sub-sampling (for example, filtering and decimating) the extracted data. The server may either store the data for future transmission or transmit the data to one or more connected devices, such as a mobile terminal or a fixed terminal.

In an embodiment, an apparatus, such as mobile terminal or fixed terminal operable in wireless or wired communication system, encompasses a method of receiving a bit-stream, extracting data from the bit-stream based on one or more criteria and sub-sampling (for example, filtering and decimating) the extracted data. The apparatus may complete processing the sub-sampled data and display the image on a display.

A more complete appreciation of all the advantages and scope of the invention can be obtained from the accompanying drawing, the description and the appended claims.

DESCRIPTION OF DRAWINGS

FIG. 2 is block diagram of components of an image processing system according to an embodiment of the invention;

DETAILED DESCRIPTION OF THE INVENTION

Figure 1B:
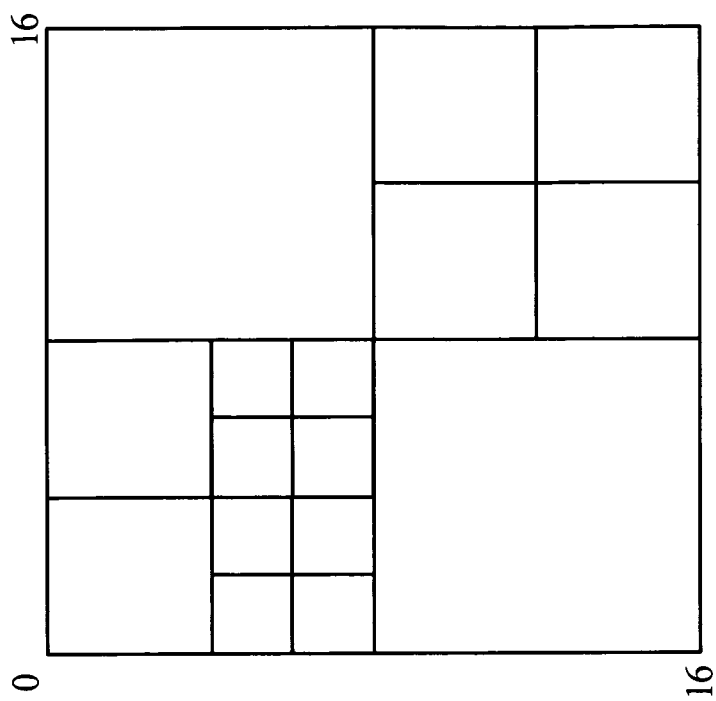
FIGS. 1A and 1B show adaptively sized blocks and sub-blocks for adaptive block size discrete cosine transform.

Generally, embodiments described below allow a compressed bit-stream to be extracted and sub-sampled in the transform domain. In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, the term "video" refers to the visual portion of multimedia and will be used interchangeably with the term "image." A storage medium may represent one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

An input video or image data stream is typically composed of image frames. An image frame can generally be divided into slices, a slice can be divided into data blocks, and a data block can be divided into pixels which are the smallest units of an image. Each image frame comprises an integer number of slices and each image slice represents the image information for a set of 16 consecutive scan lines. In such case, each data block corresponds to a 16×16 pixel block across the image of the frame. Also, a frame may be separated into even and odd slices, thereby forming even half frame and odd half frame. A frame an also be separated into various predetermined sizes without departing from the invention. In one embodiment, half frames are the fundamental packets of compressed data information that are processed by a decoder. Moreover, an image pixel can be commonly represented in the Red, Green and Blue (RGB) color component system.

However, because the human eye is more sensitive to changes in luminance and less sensitive to changes in chrominance, the YCbCr color space is typically used in video compression to represent image pixels. The YCbCr color space is a linear transformation of the RGB components, where Y is the luminance component, and Cb and Cr are the color components. If a frame is separated into even/odd frames, there would be three even half frames and three odd half frames corresponding to the components Y, Cb and Cr.

In the description above, a slice can represent a set of consecutive scan lines other than 16 consecutive scan lines. Also, a different color space with the same or different number of color components may be used to represent an image pixel in accordance with the invention.

Furthermore, compression techniques typically are based on a discrete cosine transform (DCT) in which the size of each data block is fixed. Alternatively, any reversible orthogonal transform like the integer transform can be used. One dynamic image compression technique capable of offering significant compression while preserving the quality of image signals utilizes adaptively sized blocks and sub-blocks of encoded DCT coefficient data. This technique will hereinafter be referred to as the adaptive block size discrete cosine transform (ABSDCT). The adaptive block sizes are chosen to exploit redundancy that exists for information within a frame of image data. The technique is disclosed in U.S. Pat. No. 5,021,891, entitled "Adaptive Block Size Image Compression Method And System." DCT techniques are also disclosed in U.S. Pat. No. 5,107,345, entitled "Adaptive Block Size Image Compression Method And System," and the use of the ABSDCT technique in combination with a Discrete Quadtree Transform technique is discussed in U.S. Pat. No. 5,452,104, entitled "Adaptive Block Size Image Compression Method And System." The systems disclosed in these patents utilize intraframe encoding, wherein each frame of an image sequence is encoded without regard to the content of any other frame.

Figure 1A:
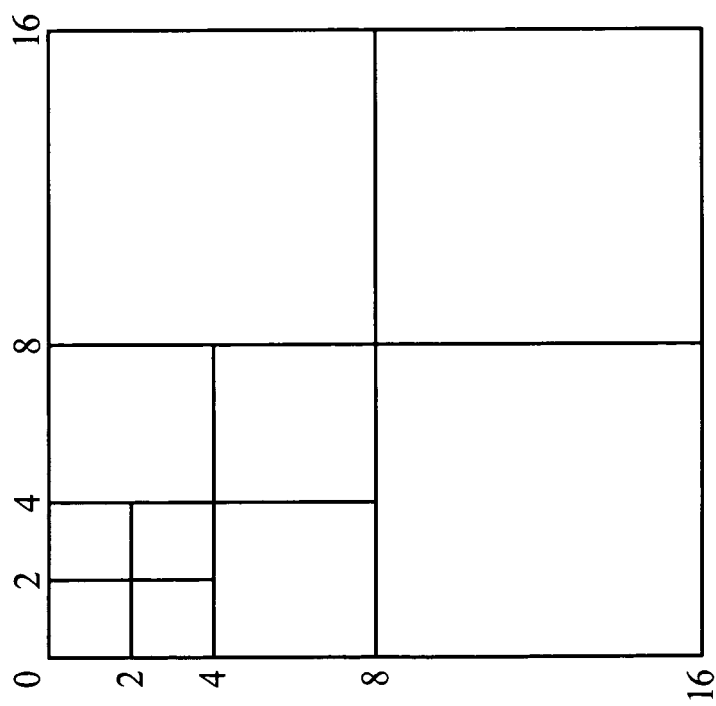

FIGS. 1A and 1B show adaptively sized blocks and sub-blocks for adaptive block size discrete cosine transform. Generally, each of the luminance and chrominance components is passed to a block interleaver (not shown). A 16×16 block is presented to the block interleaver, which orders the image samples within the 16×16 blocks to produce blocks and composite sub-blocks of data for DCT analysis. FIG. 1A shows an example, where one 16×16 DCT is applied to a first ordering, four 8×8 DCTs are applied to a second ordering, 16 4×4 DCTs are applied to a third ordering, and 64 2×2 DCTs are applied to a fourth ordering. The DCT operation reduces the spatial redundancy inherent in the image source. After the DCT is performed, most of the image signals energy tends to be concentrated in a few DCT coefficients.

For the 16×16 block and each sub-block, the transformed coefficients are analyzed to determine the number of bits required to encode the block or sub-block. Then, the block or the combination of sub-blocks, which requires the least number of bits to encode is chosen to represent the image segment. FIG. 1B shows an example where two 8×8 sub-blocks, six 4×4 sub-blocks, and eight 2×2 sub-blocks are chosen to represent the image segment. The chosen block or combination of sub-blocks is then properly arranged in order. The DCT coefficient values may then undergo further processing such as, but not limited to quantization and variable length coding.

For purposes of explanation, the transform based compression system for generating multiple descriptions or layers of compressed data will be discussed with reference to ABSDCT algorithm. However, it would be apparent to those skilled in the art that the invention is not limited to the use of ABSDCT. Other mathematical transforms such as, for example, DCT, Hadamard transform and Integer transform may also be used.

Generally, ABSDCT based compression supports encoding of up to 1920×1080 images. However, the ABSDCT algorithm is inherently scalable and can handle higher bit-depths with expanded bit-widths. It can also compress images of any size, including 4K×4K, since it is a block-based compression. Given this flexibility of ABSDCT, a system compresses, for example, a 4K×2K, image for visually lossless image quality. The resulting bit-stream of block-wise DCT coefficients would, if completely decoded, produce the DC playback sequence. This bit-stream is grouped and arranged such that lower resolution sequences can be extracted using simple operations of cropping.

More particularly, the input data may be encoded once to generate a complete bit-stream or a "Master Inventory." Within the master inventory are multiple levels of inventories. Here, a high level inventory may comprise one ore more lower level inventories. Typically, the highest level inventory would be the master inventory. Also, each inventory comprises a compressed bit-stream that may cater to a different target application.

The embodiments disclosed derive a unique characterization of digital image representations and their relationship in pixel and transform domain. Basic transform principles along with standard multi-rate DSP techniques, applied to these representations provide the required re-sampling of image data in the transform domain. The required reduction in complexity of this approach over the expansive theoretical approach is the prime advantage of the invention. In addition, the invention can be directly extended to quantization matrices to enable inverse quantization operations after the re-sampling. This eliminates the need to decode and inverse quantize before re-sampling thus reducing decoder/transcoder complexity. Generally, two aspects are involved: 1) re-sampling variable block size transform matrices and 2) inverse quantization after re-sampling so as to enable standard inverse transform operations.

More particularly, re-sampling involves re-sampling an N point sequence to increase by any factor (interpolate) or decrease by any factor (decimate) the sampling rate by any integral or fractional factor, (I,D)—a rational number, where I and D are mutually prime integers, interpolate by factor I to generate the transform of an NI point sequence and then decimate by D to get the (NI/D) point sequence. The variable block-size inverse quantization after re-sampling requires appropriate modification of quantization parameters and values. The re-sampling scheme described in (1) above can be extended to generate the re-sampled quantization matrices. The scale factors used in re-sampling the image define the filters used in re-sampling the quantization matrices.

Modified tables can be computed at the encoder and transmitted as metadata, or computed at the distribution server for the required scale factors (determined by channel or network conditions or QoS) or can be derived by the decoder based on the certain parameters defined at the terminal equipment (such as resealing matrix for the appropriate re-quantization).

FIG. 2 is a block diagram of components of in an image processing system 2100. The image processing system comprises a distribution center 2102 for encoding one or more images to produce a bit-stream 2116 and transmitting the bit-stream 2116 to at least one receive center 2118. The receive center (may be an electronic mobile device or an electronic fixed device) for decoding received bit-stream 2116 and producing an image data.

Figure 3:
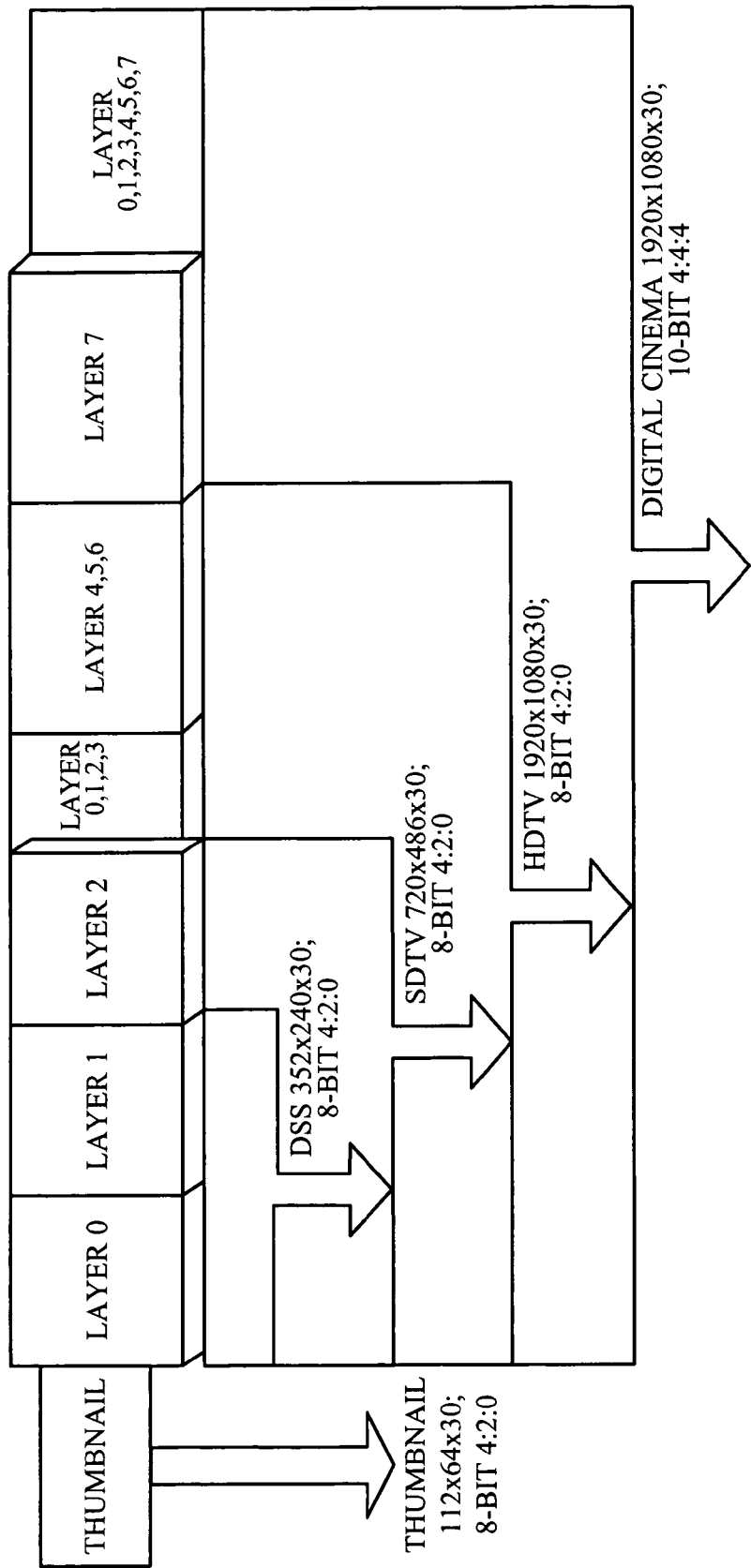
FIG. 3 illustrates a sample organization of a bit-stream according to an embodiment of the invention.

The distribution center 2102 comprises a content database 2105, a transmitter 2114 and an encode processor 2104 (hereinafter referred to as "encoder") having a variable block converter 2106, a DCT Logic, a quantizer, and bit-stream 2112. The encoder utilizes known image compression techniques to generate a compressed bit-stream 2116, which is transmitted using the transmitter 2114. Various techniques may be used by the bit-stream generator 2112 to compress and organize the image data into the bit-stream for efficient extraction at the receive center 2118. FIG. 3, discussed below, shows one such organization of a bit-stream.

The receive center 2118 comprises a transceiver 2122, a display logic 2132 a memory 2124, a decode processor 2120 (hereinafter referred to at "decoder") having a bit-stream extractor 2125, sub-sampling logic 2126, and inverse quantizer/transform 2128. Generally, the compressed bit-stream 2116 is received the transceiver 2122. Depending on the manufacture preference, the received bit-stream may be archived in memory 2124 for later processing.

In an embodiment, the receive center 2118 represents a mobile electronic device, such a mobile digital terminal operable in a wireless communication system (for example, CDMA, OFDMA, GSM, WCDMA, MPEG systems, etc. wireless systems). In this embodiment, the bit-stream may be stored temporarily and may be retransmitted to other mobile device via base station (not shown).

In another embodiment, the receive center 2118 represents an electronic device, such as a general-purpose computer or laptop, set up as a server. In this embodiment, the bit-stream may be stored temporarily man retransmitted to other mobile devices connected wirelessly or non-wirelessly to the server.

FIG. 3 illustrates an organization of a bit-stream configured according to an embodiment of the invention. The bit-stream is constructed and organized by the encoder 2104. FIG. 3 includes a thumbnail inventory that may be generated by compressing the scaled (1/256th) image formed by the means of the blocks. The target bit rate for this layer is 200 Kbps for a 112×64×24 frames per second (fps) image sequence. Multiple layers (for example 0-7) of compressed data are generated to meet the requirements of target applications. Generally, the layer associated with a quality level (for example 0-7). Thereafter, necessary layers are extracted or cropped from the multiple layers to provide a specific description of compressed data for a target application. In an alternative embodiment, an archival compression may be performed to generate an archival inventory. To generate a specific inventory for a target application, the bit-stream is decoded to an archival quality playback sequence.

Figure 4:
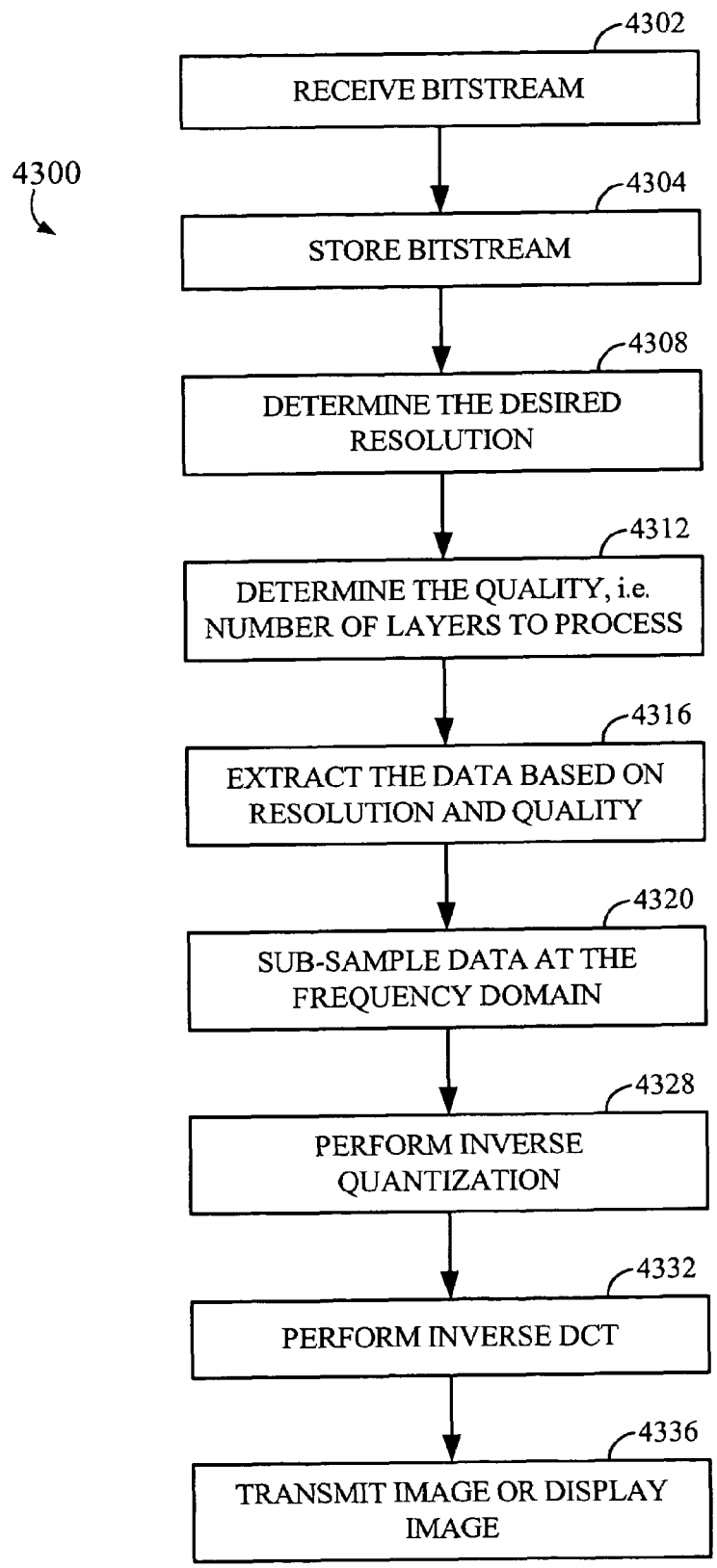
FIG. 4 illustrates a flowchart of the tasks for the receive center according to an embodiment of the invention.

FIG. 4 illustrates a flowchart 4300 of the tasks for the receive center 2118 according to an embodiment of the invention. At block 4302 the encoded and layered bit-stream is received. At block 4304, the bit-stream is stored. At block 4308, the desired resolution is determined based on one or more criteria. Depending on the manufacture of receiving center or an operator of the system, several methods may be used to determine desired resolution. In an embodiment, the receiver may be a server using an algorithm to determine the number of different resolutions required. For example, Digital Cinema requires a resolution of 1920×1080×24, High Definition Television (HDTV) requires a resolution of 1920× 1080×24, Standard Television (SDTV) requires a resolution of 720×486×24, Digital Satellite System (DSS) requires a resolution of 352×240×24 and thumbnails require a resolution of 112×64×24 that operate at compressed bit-streams of different resolutions and bit rates. Other applications include, but are not limited to, Digital Versatile Disc or Video Disc (DVD), Advanced Television Systems Committee (ATSC), Digital Video Broadcast (DVB). In another embodiment, the receiver center may be mobile terminal using a fixed resolution based on display size or adjustable resolution based on desired display size or the limited size of the screen. In determining the desired resolution, the desire level of quality, discussed below, may also be used.

At block 4312, desired level of quality is determined. The quality may be predetermined or determined using an algorithm based on one or more criteria, such as available resources, the desired resolution, system resources. In an embodiment of the invention, the decoder 2120 utilizes information, retrieved from one or more devices connected to the receiving center 2118 to derive a quality level (for example 0 to 7). The retrieved information, among other things, comprises resolution limitations, desired resolution, various system thresholds and subscription levels that may limit bandwidth the mobile devices is allowed to use or capable of using. Generally, lower the quality level; lower the required bits needed. For example, a high resolution with a high quality level will require large number of bits to be extracted from the bit-stream. In contract, the lower resolution with lower quality level will require low number of bits to be extracted from the bit-stream. Different criteria and thresholds may be used to determine the level of quality allowable at a particular time of day. For example, an available transmission bandwidth criterion may be based on currently available bandwidth for communication. Other criterion may be based on system traffic, number of users connected to the system or the number of devices connected to the receive center.

Upon determining the desired resolution and desired quality, at block 4316, appropriate data is extracted from the bit-stream 2116 to create one or more extracted streams based on determined resolution and quality. For example, an extracted stream may be based DSS resolution with quality level 4. The required DC and AC coefficients are then extracted from the bit-stream based on DSS resolution and all the bits associated with up to layer 4. Upon extracting the necessary data, the pixel blocks are reconstructed using the extracted data.

At block 4320, the block extracted stream is sub-sampled in the transform domain. Generally, the extracted stream is in a block representation of the image in the original resolution. Using the sub-sampling method, described below, in the transformed domain, the image is filtered and decimated to get the desired resolution. According to the method described below, the dyadic or non-dyadic scaling may used for decimation to avoid aliasing. Thereafter, the adjusted image data are processed using known techniques for inverse quantization and inverse DCT.

At block 4328 and 4332 the data is processed through inverse quantization and inverse DCT to produce a desired image, respectively. At block 4336, the desired image may be transmitted to other connected devices using the transceiver 2122 and/or displayed on a display using the display logic 2132.

Figure 5:
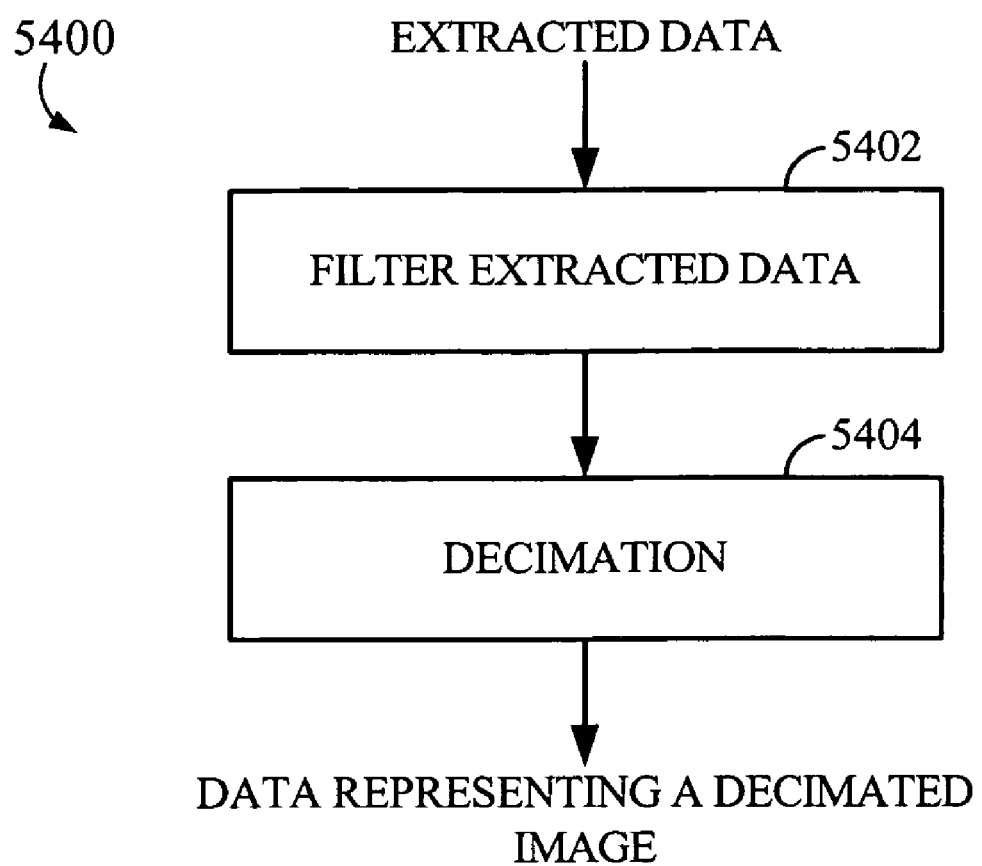
FIG. 5 illustrate a high level flowchart of tasks performed for sub-sampling in the transformed domain according to an embodiment of the invention.

FIG. 5 illustrates a high level flowchart 5400 of tasks performed for sub-sampling in the transformed domain according to an embodiment of the invention. At block 5402, the extracted data representing image in the original resolution is filtered and, at block 5404, the filtered data is decimated. DCT or transform domain resolution scaling is performed using frequency sub-sampling. Sub-sampling of images can be performed in the pixel domain or in frequency domain. Since sub-sampling is a process of filtering and decimation, it can be generalized to changing the sample rate of an N point 1-D sequence by any factor, which is a rational number (I/D), where I and D are mutually prime integers.

Basically, the N point sequence is interpolated by a factor of I to generate the DCT of an NI point sequence and then decimated by D, to get the DCT of an (NI/D) point sequence. This requires that N is a multiple of D (N=MD).

Let the original sequence be x(n) (n=0... MD−1), its DCT is:

$$X(k) = \frac{1}{\sqrt{MD}} \sum_{n=0}^{MD-1} x(n)\cos\left(\frac{(2n+1)k\pi}{2MD}\right), 0 \le k \le MD-1$$

This is interpolated by factor I by (conceptually) concatenating I copies of X and multiplying by the IMED point DCT of an appropriate interpolating filter H(k):

$$X'(k) = \frac{X(k \bmod MD)H(k)}{\sqrt{I}}, 0 \le k \le IMD-1$$

The result is then decimated by D, to generate the IM (=NI/D) point DCT of the result:

$$X''(k) = \frac{1}{\sqrt{D}} \sum_{d=0}^{D-1} X'(IMD+k), 0 \le k \le IM-1$$

This is the expression that a routine performing this operation will evaluate (for k=0 ... IM-1):

$$X''(k) = \frac{1}{\sqrt{D}} \sum_{d=0}^{D-1} X((IMD+k) \bmod MD)H(IMD+k), 0 \le k \le IM-1 \quad [1]$$

The 2D equivalent of this operation is used to achieve frequency domain sub-sampling. Equation 1 can be further simplified to simple additions for implementation purposes.

The filter H(k) is a modified Remez low pass filter. A Parks-McClellan optimal equiripple FIR low pass filter with a passband to stopband ratio of 10:1 was used. It provided a smooth roll-off yet retaining sufficient high frequency content to avoid aliasing. This filter was modified to take into consideration the effect of quantization on the DCT coefficients. Variable block size quantization redistributes emphasis on lower order high frequency components. The decisions for block break down depend on the activity in the content. If the filter had a faster roll-off, some of these critical frequency components could be attenuated causing ringing artifacts after inverse transform due to aliasing.

For non-dyadic scaling, were I and D are not necessarily prime integers, the interpolated is by a factor of [I] which is the nearest integer. The transform domain coefficients are zero padded to match the filter length to avoid aliasing.

A generic filter as this minimized distortions in the image. The optimizations are based on MMSE techniques and data dependent thresholds were derived. PSNR with spatial domain re-sampled images could be used for optimizations as well. A statistically derived Wiener filter can also be used.

Additionally, the inverse quantization tables for the re-sampled transform domain coefficients may be derived as follows: 1) The inverse quantization matrices are interpolated and decimated using the same procedure as for the transform domain coefficients; 2) The true DC quantization value is scaled by a factor equal to the re-sampling scale factor; 3) The intermediate DCs are scaled by the re-sampling scale factor of the sub-block.

This technique provides for a direct transcodability to lower or higher resolutions eliminating the need to decode to pixel domain before scaling. In addition, it is sufficient to send the scale factors and not the entire table data to the decoder and save on transmission bandwidth. The decoder can reconstruct the new inverse quantization tables. This also reduces overhead associated with scalability, since different tables can be derived for different output resolutions from the same bit-stream and original quantization tables.

As examples, the method and apparatus may also be implemented in mobile electronic devices such as a mobile telephone, PDA, portable computers, and other devices having a wireless connection system and receiving audio and video data.

While the invention has been particularly shown and described with reference to a preferred embodiment, it will be understood by those skilled in the art that various changes in form and details may be made therein without departing from the scope of the invention as defined by the appended claims. That is, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of processing image data, the method comprising acts of:

receiving a bit-stream configured according to a first scheme, wherein said bit-stream includes a block of frequency coefficients that is a frequency domain representation of a block of image data;

identifying frequency coefficients in the block of frequency coefficients based on a desired level of resolution and a desired level of quality;

extracting the identified frequency coefficients from the block of frequency coefficients, thereby generating an extracted block of frequency coefficients;

after generating the extracted block of frequency coefficients, re-sampling said extracted block of coefficients, thereby generating a resampled block of frequency coefficients;

after generating the resampled block of frequency coefficients, performing an inverse quantization operation on the resampled block of frequency coefficients, thereby generating a block of inverse quantized frequency coefficients; and applying an inverse transform to the block of inverse quantized frequency coefficients, thereby generating a reconstructed version of the block of image data, wherein the reconstructed version of the block of image data has the desired level of resolution and the desired level of quality.

2. The method of claim 1, wherein identifying frequency coefficients in the block of frequency coefficients comprises an act of selecting said desired level of resolution from a plurality of resolution levels.

3. The method of claim 2, wherein said act of selecting further comprises an act of determining highest level of resolution available based on said desired level of quality.

4. The method of claim 2, wherein said act of selecting comprises an act of selecting a value for said desired level of resolution from a group consisting of a HDTV resolution, a DVD resolution, an ATSC resolution, a DVB resolution, a DSS resolution, and a user defined resolution values.

5. The method of claim 1, wherein identifying the number of bits comprises an act of selecting said desired level of quality from a plurality of available quality levels.

6. The method of claim 5, wherein, said act of selecting further comprises an act of determining a highest level of resolution available based on said selected quality levels.

7. The method of claim 1, wherein identifying the number of bits comprises an act of determining a highest level of quality available based on said desired level of resolution.

8. The method of claim 1, wherein identifying the frequency coefficients in the block of frequency coefficients comprises an act of determining said desired level of resolution.

9. The method of claim 8, wherein said act of determining said desired level of resolution comprises an act selecting a value for said desired level of resolution from a plurality of available resolution levels.

10. The method of claim 8,
wherein said act of determining said desired level of resolution comprises an act of selecting a value for said desired level of quality from a plurality of available quality level values; and
wherein said act of determining said desired level of resolution comprises an act of calculating a highest level of resolution available based on said desired level of quality.

11. The method of claim 1, wherein the resampled block of frequency coefficients includes a different number of frequency coefficients than the extracted block of frequency coefficients.

12. The method of claim 8, wherein said act of determining said desired level of resolution comprises an act of selecting a resolution value for said desired level of resolution from a group consisting of a HDTV resolution, a DVD resolution, an ATSC resolution, a DVB resolution, a DSS resolution, and a user defined resolution values.

13. The method of claim 1,
wherein the bit-stream includes an inverse quantization matrix;
wherein the method further comprises dynamically scaling the inverse quantization matrix based on the desired level of resolution and the desired level of quality, thereby generating a rescaled inverse quantization matrix; and
wherein performing the inverse quantization operation comprises, using the rescaled inverse quantization matrix to perform the inverse quantization operation on the resampled block of frequency coefficients.

14. The method of claim 1, wherein said act of re-sampling comprises an act of scaling the extracted block of frequency coefficients using a non-dyadic scheme.

15. The method of claim 1, wherein said act of re-sampling comprises:
applying a first filter to the extracted block of frequency coefficients, thereby generating a filtered block of frequency coefficients; and
decimating the filtered block of frequency coefficients to said desired level of resolution, thereby generating the resampled block of frequency coefficients.

16. The method of claim 1, wherein said act of re-sampling comprises scaling the extracted block of frequency coefficients using a dyadic scheme.

17. The method of claim 1, wherein the inverse transform is an inverse discrete cosine transform.

18. The method of claim 1, wherein said act of receiving comprises an act of receiving said bit-stream configured according to a layered scheme.

19. The method as claimed in claim 1,
wherein the bit-stream includes a block of values that includes values that correspond to ones of the frequency coefficients in the block of frequency coefficients; and
wherein the method further comprises:
extracting values that correspond to ones of the identified frequency coefficients from the block of values; and
adding the extracted values to corresponding ones of the identified frequency coefficients as least-significant digits in the extracted block of frequency coefficients before re-sampling the extracted block of frequency coefficients.

20. The method as claimed in claim 1, further comprising an act of storing the resampled block of frequency coefficients for future transmission.

21. An apparatus for processing image data comprising:
means for receiving a bit-stream configured according to a first scheme, wherein said bit-stream includes a block of frequency coefficients that is a frequency domain representation of a block of image data,
means for identifying frequency coefficients in the block of frequency coefficients based on a desired level of resolution and a desired level of quality;
means for extracting the identified frequency coefficients from the block of frequency coefficients, thereby generating an extracted block of coefficients;
means for re-sampling said extracted block of frequency coefficients, thereby generating a resampled block of frequency coefficients;
means for performing an inverse quantization operation on the resampled block of frequency coefficients, thereby generating a block of inverse quantized frequency coefficients, wherein the means for performing the inverse quantization operation performs the inverse quantization operation after the resampled block of frequency coefficients is generated; and
means for applying an inverse transform to the block of inverse quantized frequency coefficients, thereby generating a reconstructed version of the block of image data, wherein the reconstructed version of the block of image data has the desired level of resolution and the desired level of quality.

22. The apparatus of claim 21,
wherein said means for extracting further comprises means for selecting said desired level of resolution from a plurality of resolution levels; and
wherein said means for selecting further comprising means for determining highest level of resolution available based on said desired level of quality.

23. The apparatus of claim 21, wherein the resampled block of frequency coefficients includes a different number of frequency coefficients than the extracted block of frequency coefficients.

24. The apparatus of claim 22, wherein said means for selecting comprises means for selecting a resolution value for said desired level of resolution from a group consisting of a HDTV resolution, a DVD resolution, an ATSC resolution, a DVB resolution, a DSS resolution, and a user defined resolution values.

25. The apparatus of claim 21, wherein said means for extracting further comprises means for selecting said desired level of quality from a plurality of available quality levels.

26. The apparatus of claim 25, wherein, said means for selecting further comprising means for determining a highest level of resolution available based on said selected quality levels.

27. The apparatus of claim 21, wherein said means for extracting comprises means for determining a highest level of quality available based on said desired level of resolution.

28. The apparatus of claim 21, wherein said means for extracting further comprises means for determining said desired level of resolution.

29. The apparatus of claim 28, wherein said means for determining comprises means for selecting a value for said desired level of resolution from a plurality of available resolution level values.

30. The apparatus of claim 28, wherein said means for determining comprises means for selecting a value for said desired level of quality from a plurality of available quality level values.

31. The apparatus of claim 28, wherein said means for determining comprises means for calculating a highest level of resolution available based on said desired level of quality.

32. The apparatus of claim 28, wherein said means for determining comprises means for selecting a resolution value for said desired level of resolution from a group consisting of a HDTV resolution, a DVD resolution an ATSC resolution, a DVB resolution, a DSS resolution, and a user defined resolution.

33. The apparatus of claim 21,
wherein the bit-stream includes an inverse quantization matrix;
wherein the apparatus further comprises means for dynamically scaling the inverse quantization matrix based on the desired level of resolution and the desired level of quality, thereby generating a rescaled inverse quantization matrix; and
wherein the means for performing the inverse quantization operation uses the rescaled inverse quantization matrix to perform the inverse quantization operation on the resampled block of frequency coefficients.

34. The apparatus of claim 21, wherein said means for re-sampling comprises means for scaling the extracted block of frequency coefficients using a non-dyadic scheme.

35. The apparatus of claim 21, wherein said means for re-sampling comprises:
means for applying a first filter to the extracted block of frequency coefficients, thereby generating a filtered block of frequency coefficients; and
means for decimating the filtered block of frequency coefficients to said desired level of resolution, thereby generating the resampled block of frequency coefficients.

36. The apparatus of claim 21, wherein said means for re-sampling comprises means for scaling the extracted block of frequency coefficients using a dyadic scheme.

37. The apparatus of claim 21, wherein the inverse transform is an inverse discrete cosine transform.

38. The apparatus of claim 21, wherein said means for receiving comprises means for receiving said bit-stream configured according to a layered scheme.

39. The apparatus of claim 21,
wherein the bit-stream includes a block of values that includes values that correspond to ones of the coefficients in the block of frequency coefficients; and
wherein the apparatus further comprises:
means for extracting values that correspond to ones of the identified frequency coefficients from the block of values; and
means for adding the extracted values to corresponding ones of the identified frequency coefficients as least-significant digits in the extracted block of coefficients before re-sampling the extracted block of frequency coefficients.

40. The apparatus of claim 21, further comprising means for storing said received bit-stream for future transmission.

41. A computer-readable medium comprising instructions that, when executed by one or more processors, cause the one or more processors to:
receive a bit-stream configured according to a first scheme, wherein said bit-stream includes a block of frequency coefficients that is a frequency domain representation of a block of image data;
identifying frequency coefficients in the block of frequency coefficients based on a desired level of resolution and a desired level of quality;
extract the identified frequency coefficients from the block of frequency coefficients, thereby generating an extracted block of frequency coefficients;
resample said extracted block of frequency coefficients, thereby generating a resampled block of frequency coefficients;
performs, after the resampled block of frequency coefficients is generated, an inverse quantization operation on the resampled block of frequency coefficients, thereby generating a block of inverse quantized frequency coefficients; and
apply an inverse transform to the block of inverse quantized frequency coefficients, thereby generating a reconstructed version of the block of image data, wherein the reconstructed version of the block of image data has the desired level of resolution and the desired level of quality.

42. The computer-readable media of claim 41, wherein said instructions cause the one or more processors to identify the frequency coefficients at least in part by causing the one or more processors to select said desired level of resolution from a plurality of resolution levels.

43. The computer-readable media of claim 42, wherein said instructions cause the one or more processors to select said desired level of resolution at least in part by causing the one or more processors to determine a highest level of resolution available based on said desired level of quality.

44. The computer-readable media of claim 42, wherein said instructions cause the one or more processors to select said desired level of resolution at least in part by causing the one or more processors to select said desired level of resolution from a group consisting of a HDTV resolution, a DVD resolution, an ATSC resolution, a DVB resolution, a DSS resolution, and a user defined resolution.

45. The computer-readable media of claim 41, wherein said instructions cause the one or more processors to identify the frequency coefficients at least in part by causing the one or more processors to select said desired level of quality from a plurality of available quality levels.

46. The computer-readable media of claim 45, wherein said instructions cause the one or more processors to select said desired level of quality at least in part by causing the one or more processors to determine a highest level of resolution available based on said selected quality levels.

47. The computer-readable media of claim 41, wherein said instructions cause the one or more processors to identify the frequency coefficients at least in part by causing the one or more processors to determine a highest level of quality available based on said desired level of resolution.

48. The computer-readable media of claim 41, wherein said instructions cause the one or more processors to identify the frequency coefficients at least in part by causing the one or more processors to determine said desired level of resolution.

49. The computer-readable media of claim 48, wherein said instructions cause the one or more processors to determine said desired level of resolution at least in part by causing the one or more processors to select a value for said desired level of resolution from a plurality of available resolution level values.

50. The computer-readable media of claim 48, wherein said instructions cause the one or more processors to determine said desired level of resolution at least in part by causing the one or more processors to identify the desired level of resolution as a highest level of resolution available based on said desired level of quality.

51. The computer-readable media of claim 41, wherein the resampled block of frequency coefficients includes a different number of frequency coefficients than the extracted block of frequency coefficients.

52. The computer-readable media of claim 48, wherein said instructions cause the one or more processors to determine said desired level of resolution at least in part by causing the one or more processors to select a resolution value for said desired level of resolution from a group consisting of a HDTV resolution, a DVD resolution, an ATSC resolution, a DVB resolution, a DSS resolution, and a user defined resolution values.

53. The computer-readable media of claim 41,
wherein the bit-stream includes an inverse quantization matrix;
wherein said instructions cause the one or more processors to dynamically scale the inverse quantization matrix based on the desired level of resolution and the desired level of quality, thereby generating a rescaled inverse quantization matrix; and
wherein the instructions cause the one or more processors to perform the inverse quantization operation at least in part by causing the one or more processors to use, after the resampled block of frequency coefficients is generated, the rescaled inverse quantization matrix to perform the inverse quantization operation on the resampled block of frequency coefficients.

54. The computer-readable media of claim 41, wherein said instructions cause the one or more processors to resample the extracted block of frequency coefficients at least in part by causing the one or more processors to scale the extracted block of frequency coefficients using non-dyadic scheme.

55. The computer-readable media of claim 41, wherein said instructions cause the one or more processors to resample the extracted block of frequency coefficients at least in part by causing the one or more processors to:
apply a first filter to the extracted block of frequency coefficients, thereby generating a filtered block of frequency coefficients; and
decimate the filtered block of frequency coefficients to said desired level of resolution, thereby generating the resampled block of frequency coefficients.

56. The computer-readable media of claim 41, wherein said instructions cause the one or more processors to resample the extracted block of frequency coefficients at least in part by causing the one or more processors to scale the extracted block of frequency coefficients for using a dyadic scheme.

57. The computer-readable media of claim 41, wherein the inverse transform is an inverse discrete cosine transform.

58. The computer-readable media of claim 41, wherein said instructions cause the one or more processors to receive the bit-stream at least in part by causing the one or more processors to receive said bit-stream configured according to a layered scheme.

59. The computer-readable media of claim 41,
wherein the bit-stream includes a block of values that includes values that correspond to ones of the frequency coefficients in the block of frequency coefficients; and
wherein the instructions further cause the one or more processors to:
extract values that correspond to ones of the identified frequency coefficients from the block of values; and
add the extracted values to corresponding ones of the identified frequency coefficients as least-significant digits in the extracted block of frequency coefficients before re-sampling the extracted block of frequency coefficients.

60. The computer-readable media of claim 41, wherein the instructions further cause the one or more processors to store said block of frequency coefficients for future transmission.

61. An apparatus for processing image data comprising:
a processor, wherein said processor:
receives a bit-stream configured according to a first scheme, wherein said bit-stream includes a block of frequency coefficients that is a frequency domain representation of a block of image data;
identifies frequency coefficients in the block of frequency coefficients base on a desired level of resolution and a desired level of quality;
extracts the identified frequency coefficients from the block of frequency coefficients, thereby generating an extracted block of frequency coefficients that includes a different number of frequency coefficients than the extracted block of frequency coefficients;
after generating the extracted block of frequency coefficients, re-samples said extracted block of frequency coefficients, thereby generating a resampled block of frequency coefficients;
after the resampled block of frequency coefficients is generated, performs an inverse quantization operation on the resampled block of frequency coefficients, thereby generating a block of inverse quantized frequency coefficients; and
applies an inverse transform to the block of inverse quantized frequency coefficients, thereby generating a reconstructed version of the block of image data, wherein the reconstructed version of the block of image data has the desired level of resolution and the desired level of quality.

62. The apparatus of claim 61, wherein the resampled block of frequency coefficients includes a different number of frequency coefficients than the extracted block of frequency coefficients.

63. The apparatus of claim 61, wherein said bit-stream is configured according to a layered scheme.

64. The apparatus of claim 61, wherein said desired level of resolution having a resolution value, said resolution value selected from a group consisting of a HDTV resolution, a DVD resolution, an ATSC resolution, a DVB resolution, a DSS resolution, and a user defined resolution values.

65. The apparatus of claim 61, wherein said desired level of resolution comprises a level value selected from a plurality of resolution level values.

66. The apparatus of claim 65, wherein at least one resolution level value of said plurality of resolution level values is based on said desired level of quality.

67. The apparatus of claim 61, wherein said desired level of quality comprises a level value selected from a plurality of quality level values.

68. The apparatus of claim 67, wherein at least one quality level value of said plurality of quality level values is based on said desired level of resolution.

69. The apparatus of claim 61, wherein said processor further determines said desired level of quality prior to extracting data from said bit-stream.

70. The apparatus of claim 61, wherein said processor further determines said desired level of resolution.

71. The apparatus of claim 70, wherein said processor further determines said desired level of resolution prior to extracting data from said bit-stream.

72. The apparatus of claim 61,
wherein the bit-stream includes an inverse quantization matrix;
wherein the processor dynamically scales the inverse quantization matrix based on the desired level of resolution and the desired level of quality, thereby generating a rescaled inverse quantization matrix; and
wherein the processor uses the rescaled inverse quantization matrix to perform the inverse quantization operation on the resampled block of frequency coefficients.

73. The apparatus of claim 61, wherein said desired level of resolution having a resolution value, said resolution value is selected from a group consisting of a HDTV resolution, a DVD resolution, an ATSC resolution, a DVB resolution, a DSS resolution, and a user defined resolution values.

74. The apparatus of claim 61, wherein said decoder scales said extracted block of coefficients using a non-dyadic scheme.

75. The apparatus of claim 61, wherein said desired level of resolution comprises a level selected from a plurality of resolution levels.

76. The apparatus of claim 61, further comprising a memory for storing the extracted block of frequency coefficients.

77. The apparatus of claim 61, further comprising display logic that displays the block of image data.

78. A system for processing image data, the system comprising:
an encoder that generates a bit-stream based on a first scheme and transmits said bit-stream, wherein said bit-stream includes a block of frequency coefficients that is a frequency domain representation of a block of image data; and
a decoder, that comprises:
a transceiver that receives said transmitted bit-stream;
a bit-extractor that identifies frequency coefficients in the block of frequency coefficients based on a desired level of resolution and a desired level of quality; and that
extracts the identified frequency coefficients from the block of frequency coefficients, thereby generating an extracted block of frequency coefficients;
a resampling logic unit that re-samples said extracted block of frequency coefficients, thereby generating a resampled block of coefficients;
a quantizer that, after the resampled block of frequency coefficients is generated, performs an inverse quantization operation on the resampled block of frequency coefficients, thereby generating a block of inverse quantized frequency coefficients; and
a transform unit that applies an inverse discrete cosine transform to the block of inverse quantized frequency coefficients, thereby generating a reconstructed version of the block of image data, wherein the reconstructed version of the block of image data has the desired level of resolution and the desired level of quality.

79. The system as claimed in 78, wherein said first scheme comprises a layered scheme.

80. The system of claim 78,
wherein the bit-stream includes an inverse quantization matrix;
wherein the quantizer dynamically scales the inverse quantization matrix based on the desired level of resolution and the desired level of quality, thereby generating a rescaled inverse quantization matrix; and
wherein, after the resampled block of frequency coefficients is generated, the quantizer uses the rescaled inverse quantization matrix to perform an inverse quantization operation on the resampled block of frequency coefficients.

81. The system of claim 78, a value for said desired level of resolution is selected from a group consisting of a HDTV resolution, a DVD resolution, an ATSC resolution, a DVB resolution, a DSS resolution, and a user defined resolution values.

82. The system of claim 78, wherein said resampling logic unit scales said extracted block of frequency coefficients using a non-dyadic scheme.

83. The system of claim 78, wherein the resampling logic unit comprises:
a filter module that applies a filter to the extracted block of frequency coefficients, thereby generating a filtered block of frequency coefficients; and
a decimator that decimates the filtered block of frequency coefficients to said desired level of resolution, thereby generating the resampled block of frequency coefficients.

84. The system as claimed in claim 78, wherein said desired level of resolution comprises a level selected from a plurality of resolution levels.

* * * * *